Patented Nov. 27, 1928.

1,693,026

UNITED STATES PATENT OFFICE.

ELMER E. ELDREDGE, OF WILMETTE, ILLINOIS, ASSIGNOR TO KRAFT-PHENIX CHEESE COMPANY, OF CHICAGO, ILLINOIS, A CORPORATION OF ILLINOIS.

PRESERVATION OF DAIRY PRODUCTS.

No Drawing.    Application filed June 13, 1927. Serial No. 198,697.

The invention relates to the art of preserving dairy products and the principal objects of the invention are to provide processes or methods of preserving dairy products for example, cheeses which, so far as heretofore known to me, do not respond to the methods or processes in vogue at the time of my invention; to provide a process which while being effective in enhancing the keeping qualities of the cheese, will not seriously or perceptively alter the character of the cheese in respect of its texture, flavor or nutritive properties; and to provide products of superior keeping qualities with their customary properties substantially unimpaired.

For many years, the desirability of enhancing the keeping qualities of dairy products and the advantages of putting up such products in relatively small packages for retail distribution has been generally recognized. However, in the case of dairy products containing casein either in its original or an altered form, no material progress has been made in the art of preservation or sterilization until the date of the invention set forth in the U. S. patent to James L. Kraft, No. 1,186,524. Said patent and other subsequent patents disclose a way in which more or less homogeneous cheeses of the cured type such as those belonging to the Cheddar or Swiss group can be sterilized or heat treated to improve their keeping qualities and at the same time repackaged in suitable retail sizes.

So far as I am aware, prior to the invention described herein, these prior methods of sterilizing, pasteurizing or heat treating of cheese have been inapplicable to cheeses of the uncured type, for example, cottage cheese and cream cheese. Such cheeses, when treated by the old methods are so changed in texture, body and flavor as to bear little resemblance to the original starting material and hence, are more or less unsaleable.

The principal difficulty encountered in heat treating of any cheese product has been disintegration, i. e. separation of the butter fat from the other constituents of the cheese and, so far as known prior hereto, this difficulty in cases not only of uncured cheeses, but also of some other types, has been insurmountable.

I have discovered that such cheeses can be successfully heat treated to improve their keeping qualities if there be added to the cheese prior to the heat treatment a relatively small percentage of a stabilizing colloid. The colloids which I have found generally available for this purpose may be classed under the general group of gums and of such gums which I have employed in practicing the invention, the most successful examples of an edible or innocuous type are fruit pectin and gum tragacanth, such gums both being of vegetable origin.

General method.

With the starting material there is incorporated from 1/4% to 2 1/2% (by weight) of the stabilizing colloid, using only sufficient of the colloid to perform the required function. Such mixing of the stabilizer with the starting material may be facilitated by first dissolving the stabilizer in a small quantity of water. In some cases it may be necessary to warm the material in order properly to incorporate the stabilizer with the cheese, but preferably it is advisable not to exceed a temperature at which casein will ordinarily become plastic, that is to say, in the neighborhood of 125° F.

After the stabilizing ingredient has been incorporated with the starting material, the latter is preferably subdivided and introduced into the final shipping containers which are then heated to the required temperature and for a sufficient length of time to insure the destruction of those deleterious or degenerative agents which under ordinary circumstances would cause the cheese to degenerate, decay, or otherwise become unfit for sale or consumption. Ordinarily, the temperature of 160° F. maintained for thirty (30) minutes will be sufficient to secure the desired degree of sterilization.

Examples.

Cream cheese combined with added ingredients to form a relish.

For the starting material take a batch of 100 pounds of fresh cream cheese of good commercial grade, i. e. cream cheese made from milk having its butter fat content raised to 65% dry basis. Prepare a water solution of powdered gum tragacanth. Use one-half pound of dry gum in about 5 or 10 pounds of water. The solution of gum tragacanth is then incorporated with the batch by stirring it in at ordinary room temperature, after which the desired relish ingredients such as comminuted pimentos, pickles, etc., may be added to suit the desired taste. The mixing may be effected by any suitable form of power operated agitator.

After the batch has been properly mixed, the material is preferably packed in sealed containers and for this purpose I have ordinarily employed glass jars having screw caps. Although it is desirable to employ a reasonably air tight seal, an absolutely hermetic seal is not essential to obtain satisfactory commercial results.

After the jars have been filled and closed, they are immersed in hot water for a sufficient length of time to destroy or kill the various organisms including enzymes, which normally would cause the rapid deterioration of the untreated material. In the case of the example given, and employing 6 ounce glass jars, water at a temperature of 160° F. is employed and it is found that when subjected to this treatment the material in the center of the jar will attain a temperature of about 150° F. at the end of one hour or less.

Ordinarily, according to my experience the undesirable organisms which have the greatest effect in causing deterioration of the product will be killed at a temperature of 150° F. For obvious reasons it is preferable not to employ any higher temperature than necessary to obtain the desired result. In order to reduce the time of the heating process, a vigorous circulation in the water bath is of some value. Obviously, larger containers require a longer period of treatment than small containers which have relatively large surface area compared with their cubical content. After the heating step the containers are cooled and the cheese is then ready for shipment.

A cheese containing relish ingredients prepared, packed, and treated according to the above method will keep as long as six weeks at ordinary room temperatures, whereas ordinary cream cheese with or without the relish ingredients incorporated therein, and even when prepared from pasteurized milk and cream, will not keep more than two days or less, at ordinary room temperature of say 70° F.

The old methods of sterilizing, pasteurizing, or heat treating of cheese have been found to be inapplicable to the treatment of cheeses of the cream type, for the reason that cheese when subjected to such treatment is so changed in texture, body and flavor, as to bear little resemblance to the original material and is wholly unsaleable as such. On the other hand, similar cheeses of the cream type when subjected to this improved process, suffer no perceptible deterioration in texture, body, flavor, or other qualities possessed by the original material.

The same general method may be employed in connection with the pasteurization or sterilization of cottage cheese and also cream cheese without the relish ingredients. However, in the case of light colored cheeses such as cream cheese or cottage cheese, I prefer to use fruit pectin as a stabilizer instead of the gum tragacanth. In the case of pectin, I use of the pure material slightly less than in the case of the gum tragacanth and, of course, a correspondingly greater amount if the pectin is of the commercial grade which is about 50% as potent as the pure material. In the case of pectin, it is not necessary to use quite as much water for dissolving the same as in the case of gum tragacanth.

The invention is also applicable to the sterilization or pasteurization of club cheese which is the name usually given to a cheese prepared by grinding up cheeses of the American type which arrived at the proper stage of cure and to which if desired, there is added a small percentage of butter to give the desired body and flavor. Ordinarily this club cheese is made from cheese which has reached a rather advanced stage of curing, and such cheese has a certain individuality of texture, body and flavor which distinguishes it from the ordinary American cheese of the Cheddar type. So far as I am aware, no one has ever been able to put up this club cheese in such form or to treat it successfully after packaging to the extent necessary to materially improve its keeping qualities without spoiling the characteristic texture, body and flavor generally accepted for club cheese.

In applying the invention to club cheese, the cheese is first ground up in the same way as when making club or potted cheese and to the ground up cheese there is added a solution of 1½ pounds of gum tragacanth for each 100 pounds of starting material. The solution is obtained by dissolving the gum tragacanth in about ten pounds of water.

After the gum solution has been incorporated with the ground up cheese, the mass is warmed to a temperature above the melting point of butter fat (95° F.). It is not necessary, and ordinarily not desirable, to exceed a temperature of 125° F. on account of the fact that casein becomes plastic at a temperature of approximately 125° F. The mass is stirred vigorously in the ordinary water jacketed mixing kettle while the heat is being applied so that all parts of the mass attain the same uniform temperature.

After the desired temperature has been obtained, the material is packed into suitable containers which need not necessarily be of the hermetic type. I have successfully used glass jars having screw tops and containing about six ounces of the finished product. The filled and closed jars are then heated in a water bath for about an hour at a temperature of about 160° F. so that all parts of the cheese, even in the center of the container, attain a temperature of 150° F. The jars are then removed, cooled and are ready for shipment.

Where it is desired to use pectin instead of gum tragacanth, it is necessary to use slightly more of the commercial pectin or slightly less of the pure pectin than in the case of gum tragacanth.

Cheese of the club type prepared, packaged and treated in this manner will keep many times as long as ordinary club cheese without any material deterioration in flavor, body texture or saleability and the cheese so prepared possesses all of the characteristics of regular club cheese.

The described details of process are illustrative of preferred applications only of the invention, the scope of which should be determined by reference to the appended claims, said claims being construed as broadly as possible, consistent with the state of the art.

I claim as my invention:

1. The method of improving the keeping quality of cheese which consists in incorporating with the starting material a relatively small percentage of a stabilizing colloid, and subsequently heating the same to sufficiently destroy contained deleterious agents.

2. The method of improving the keeping quality of cheese which consists in incorporating with the starting material a relatively small percentage of a stabilizing colloid while not exceeding a temperature at which casein becomes plastic and subsequently heating the material sufficiently to destroy contained deleterious agents.

3. The method of improving the keeping quality of cheese which consists in incorporating with the starting material a relatively small percentage of a stabilizing colloid, sub-dividing the mass and introducing it into shipping containers, and subsequently heating the material while in the containers sufficiently to destroy contained deleterious agents.

4. The method of improving the keeping quality of cheese which consists in incorporating with the starting material a relatively small percentage of a stabilizing colloid, while not exceeding a temperature at which casein becomes plastic, sub-dividing the mass and introducing it into shipping containers, and subsequently heating the material while in the containers sufficiently to destroy contained deleterious agents.

5. The improvement in the art of preventing deterioration in cheese which consists in incorporating in the cheese a relatively small percentage of a gum, and subsequently heating the same sufficiently to kill the contained organisms which would normally cause deterioration.

6. The improvement in the art of preventing deterioration in cheese while preserving the normal characteristics thereof which consist in incorporating with the cheese a relatively small percentage of a gum, and subsequently heating same sufficiently to kill the contained organisms which normally cause deterioration, while not exceeding a temperature of approximately 160° F.

7. The improvement in the art of preventing deterioration in cheese which consists in incorporating with the cheese a relatively small percentage of a gum at a temperature less than that at which casein would ordinarily become plastic, and subsequently heating same sufficiently to kill the contained organisms which would normally cause deterioration and while maintaining the mass in a quiescent state.

8. The improvement in the art of preventing deterioration in cheese, which consists in incorporating with the cheese a relatively small percentage of a gum, while not exceeding a temperature of that at which casein would ordinarily become plastic, packing the mixed material into shipping containers, and subsequently heating the containers and their contents sufficiently to kill the contained organisms which would normally cause deterioration.

9. The method of improving the keeping quality of cheese which consists in incorporating with the starting material a relatively small percentage of gum tragacanth, and subsequently heating the same sufficiently to destroy contained deleterious agents.

10. The method of improving the keeping quality of cheese which consists in incorporating with the starting material a relatively small percentage of gum tragacanth, while not exceeding a temperature at which casein becomes plastic and subsequently heating the material sufficiently to destroy contained deleterious agents.

11. The method of improving the keeping quality of cheese which consists in incorporating with the starting material a relatively small percentage of gum tragacanth, while not exceeding a temperature high enough to impair desirable properties of the cheese, sub-dividing the mass and introducing it into shipping containers, and subsequently heating the material while in the containers sufficiently to destroy contained deleterious agents.

ELMER E. ELDREDGE.